E. SMITH.
CAB VENTILATOR.
APPLICATION FILED NOV. 27, 1907.
910,023.
Patented Jan. 19, 1909.
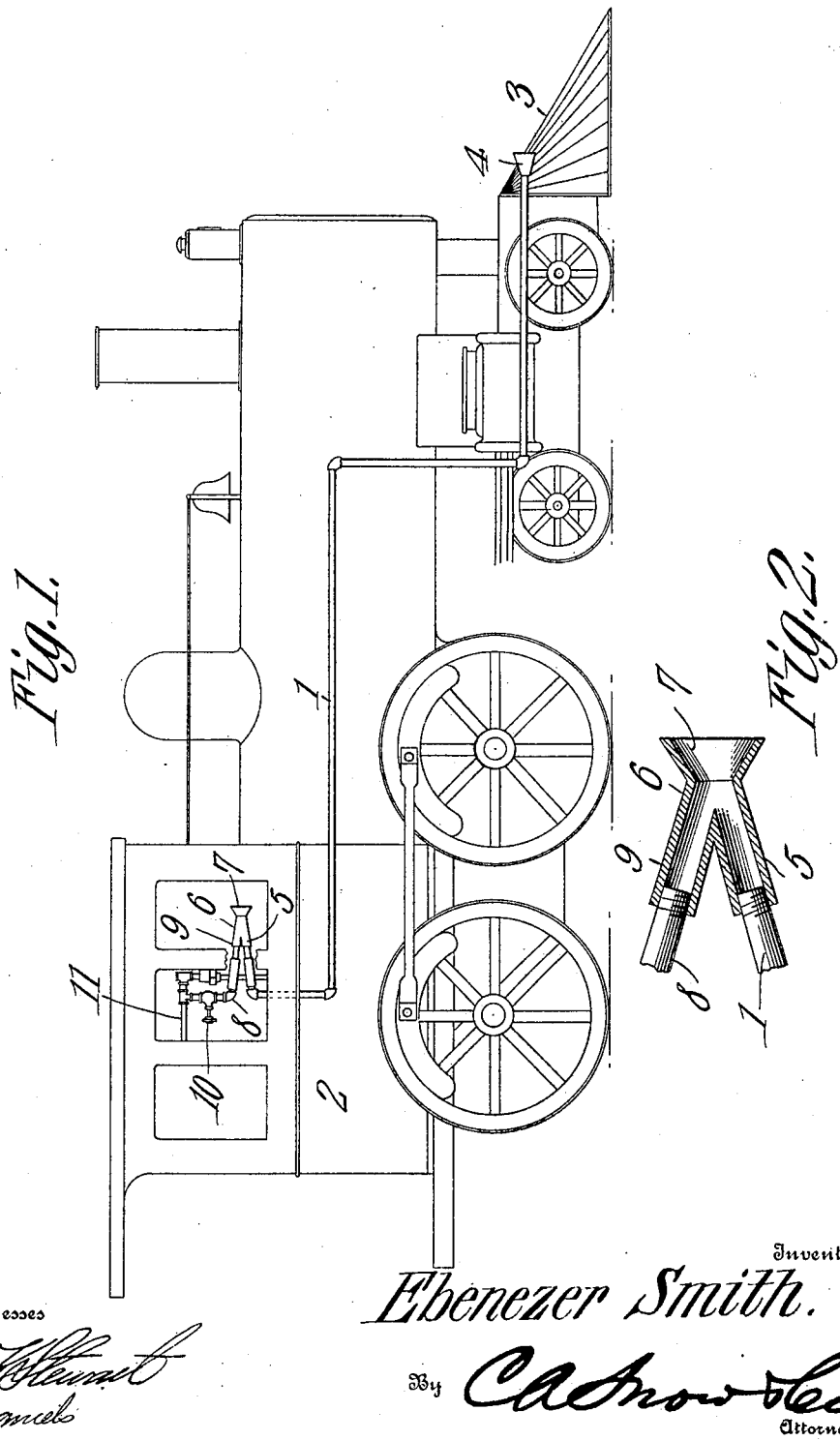
Witnesses
Inventor
Ebenezer Smith.
By C. A. Snow & Co.
Attorneys

UNITED STATES PATENT OFFICE.

EBENEZER SMITH, OF GORDON, PENNSYLVANIA.

CAB-VENTILATOR.

No. 910,023.          Specification of Letters Patent.          Patented Jan. 19, 1909.

Application filed November 27, 1907. Serial No. 404,105.

*To all whom it may concern:*

Be it known that I, EBENEZER SMITH, a citizen of the United States, residing at Gordon, in the county of Schuylkill and State of Pennsylvania, have invented a new and useful Cab-Ventilator, of which the following is a specification.

This invention has relation to cab ventilators and it consists in the novel construction and arrangement of its parts as hereinafter shown and described.

The object of the invention is to provide a ventilator adapted to be operated through the instrumentality of compressed air commonly used upon locomotives and trains for applying the brakes and other purposes.

The parts of the said ventilator are so arranged as to conduct pure air from the exterior of an engine cab into the interior thereof and discharge the same so that the cab will be kept free of smoke and noxious gases with which the cab is frequently filled, especially when passing through a tunnel.

In the accompanying drawing: Figure 1 is a side elevation of a locomotive equipped with the cab ventilator. Fig. 2 is a detailed sectional view of the discharge nozzle of the cab ventilator.

The ventilator consists of the pipe 1 which extends from the engine cab 2 to the forward part of the engine and terminates preferably in advance of the pilot 3. The forward end of the pipe 1 is provided with a forwardly disposed funnel 4. The rear end of the pipe 1 connects with the induction branch 5 of the nozzle 6. Said nozzle is provided with a bell mouthed eduction port 7 which is forwardly disposed in the cab 2. The air pipe 8 connects with the induction branch 9 of the nozzle 6. The said branches 5 and 9 converge toward each other and merge into each other at the eduction port 7. The pipe 8 is provided with a valve 10 and connects with the compressed air pipe 11 or other source for supplying compressed air to the nozzle 6.

The operation of the ventilator is as follows: By opening the valve 10 compressed air passes from the pipe 11 or its equivalent through the pipe 8 and into the branch 9 of the nozzle 6. As the compressed air passes through the said branch and out through the port 7 of the said nozzle it sweeps across the end of the branch 5 of the nozzle 6 and draws fresh air through the pipe 1 from the exterior of the cab 2 into the interior thereof and discharges the said fresh air through the bell mouthed port 7 into the forward part of the cab 2. The fresh air is thus introduced into the cab and fills the same and in its endeavor to make an escape from the cab will prevent the smoke and gases emanating from the stack of the engine from entering the cab. Thus, the occupants of the cab are supplied with fresh air and may at all times be sufficiently supplied with oxygen to attend to the manipulation of the engine.

The ventilator is especially advantageous for use in tunnels where it conducts the cool pure air from the floor of the tunnel up into the cab which supplies the needs of the operators, and at the same time, prevents the entrance of smoke and gases as they rebound from the roof of the tunnel. In as much as, the nozzle 6 is forwardly disposed the occupants of the cab are not subjected to draft and the disadvantages incidental thereto, as the air is expelled from the nozzle into the forward part of the cab and may gently sweep back through the same and perform its function in keeping the cab free of the objectional elements mentioned.

Having thus described my invention, what I claim as new and desire to secure by Letters-Patent is:

A ventilator for moving vehicles comprising an air pipe leading from the exterior to the interior of the vehicle and having an inlet and outlet disposed in the same direction and in the direction in which the vehicle is moving, and means for directing a blast of air across the outlet of the pipe and approximately in the direction in which the vehicle is moving.

In testimony that I claim the foregoing as my own, I have hereto affixed my signature in the presence of two witnesses.

EBENEZER SMITH.

Witnesses:
R. A. EVANS,
B. J. SMITH.